G. CHROMY.
STOVE LID LIFTER.
APPLICATION FILED APR. 2, 1918.

1,287,229.

Patented Dec. 10, 1918.

Witnesses
R. G. Thomas
L. B. Middleton

Inventor
George Chromy

By Victor J. Evans
Attorney

UNITED STATES PATENT OFFICE.

GEORGE CHROMY, OF STEWART, MINNESOTA.

STOVE-LID LIFTER.

1,287,229.  Specification of Letters Patent.  Patented Dec. 10, 1918.

Application filed April 2, 1918. Serial No. 226,242.

*To all whom it may concern:*

Be it known that I, GEORGE CHROMY, a citizen of the United States, residing at Stewart, in the county of McLeod and State of Minnesota, have invented new and useful Improvements in Stove-Lid Lifters, of which the following is a specification.

This invention relates to new and useful improvements in stove lid lifters, and the principal object of the invention is to provide a lifter which may be so clamped to the lid that all danger of the lid dropping therefrom is obviated.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
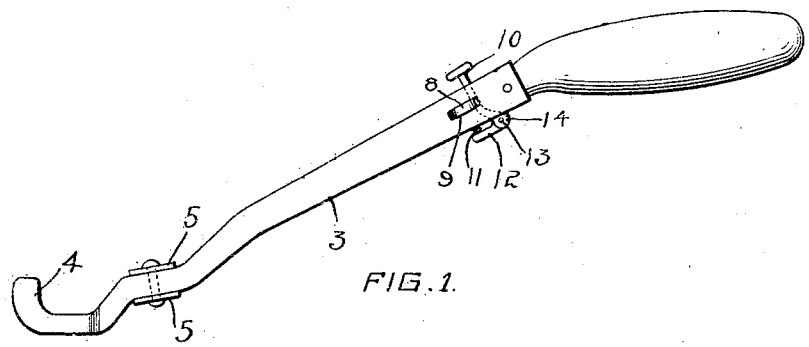
Figure 1 is a side view of the device.
Figure 2:
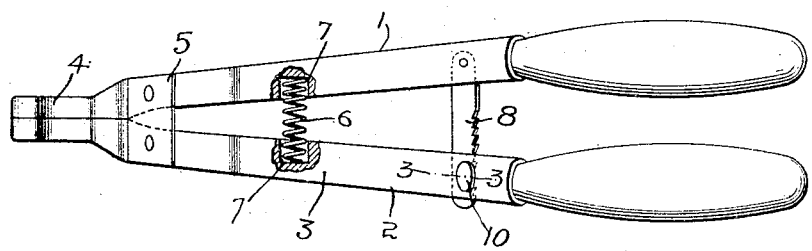
Fig. 2 is a plan view.
Figure 3:
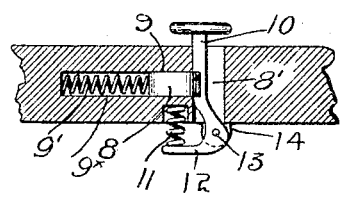
Fig. 3 is a section on line 3—3 of Fig. 2.

As shown in these views the invention includes a pair of members, 1 and 2, each consisting of a handle part 3 and the hook part 4. The two members are pivoted together immediately above the hooks by a pair of plates 5, which are pivoted to each member, said members being arranged side by side as shown in Fig. 2. The members are normally held with the handle parts separated, and the hook parts in engagement by a spring 6, having its ends engaging recesses 7 formed in said handle parts. One of the handle parts has a toothed plate 8 pivoted thereto, while the other handle part is provided with a slot 9 through which the end of the plate passes. A spring 9' located in a recess 9* forces said plate forwardly in said slot. A lever 10 is carried by the slotted handle part and this lever passes through a second slot 8' which communicates with and extends at right angles to the slot 9 and said lever is held in engagement with one of the teeth of the plate by means of a spring 11 engaging a projection 12 formed on the end of the lever 10, said lever being pivoted at 13 to lugs 14 on the handle part, as shown. This lever is somewhat similar to a bell crank lever. As will be seen the walls of the slot 8' will prevent the plate 8 from following the lever 10 to its rearmost position. In operating the device only one handle is grasped by the hand or if both handles are grasped one handle must be held sufficiently loose to permit the spring 6 to operate. As will be seen the lever 10, by engaging any one of the teeth on the plate 8 will hold the handle parts in any desired position relative to each other, and by moving said lever to release the plate the spring 6 will cause said handle parts to spring apart and bring the hooked parts into contact.

The device is placed in engagement with the stove lid and then the handle parts are pressed together until the hooks clamp said lid. The parts are held in the clamping position by the lever 10 and plate 8. When the lid is to be released it is simply necessary to move the lever 10 to allow the spring 6 to return the parts to normal position.

It is thought from the foregoing description that the advantages and novel features of my invention will be readily apparent.

What I claim is:—

A stove lid lifter comprising a pair of members pivoted together, each member consisting of a handle part and a hook part, one of said parts having a recess therein and a horizontal slot and a vertical slot extending at right angles to each other, a spring for normally holding the hook parts together, a tooth plate carried by one handle part and passing through the horizontal slot, a spring in the recess for holding the plate forwardly in said slot, a pivoted lever carried by the other handle part and passing through the vertical slot and engaging the teeth on said plate for holding the hook parts spaced apart any desired distance, and a spring engaging said lever for forcing the same into engagement with said teeth.

In testimony whereof I affix my signature.

GEORGE CHROMY.